(12) United States Patent
Yeh et al.

(10) Patent No.: US 7,686,510 B2
(45) Date of Patent: Mar. 30, 2010

(54) STRUCTURE FOR A ROD RADIATION SOURCE AND ITS CALIBRATION PHANTOM

(75) Inventors: Chin-Hsien Yeh, Taoyuan County (TW); Ming-Chen Yuan, Taoyuan County (TW)

(73) Assignee: Institute of Nuclear Energy Research, Longtan, Taoyuan (TW)

(*) Notice: Subject to any disclaimer, the term of this patent is extended or adjusted under 35 U.S.C. 154(b) by 63 days.

(21) Appl. No.: 12/199,805

(22) Filed: Aug. 28, 2008

(65) Prior Publication Data
US 2010/0054421 A1    Mar. 4, 2010

(51) Int. Cl.
*H05G 1/02* (2006.01)
*H05G 1/54* (2006.01)

(52) U.S. Cl. .................. 378/193; 378/119
(58) Field of Classification Search ........... 378/119, 378/193, 156–160, 207; 250/252.1
See application file for complete search history.

(56) References Cited

U.S. PATENT DOCUMENTS

| | | | | |
|---|---|---|---|---|
| 4,888,555 A * | 12/1989 | Vaughan et al. | ............. | 324/318 |
| 5,422,492 A * | 6/1995 | Lecik et al. | ............... | 250/496.1 |
| 7,569,829 B2 * | 8/2009 | Chen et al. | ............. | 250/363.09 |
| 2008/0093544 A1 * | 4/2008 | Wang et al. | ............... | 250/252.1 |
| 2009/0084947 A1 * | 4/2009 | Yanagita et al. | .......... | 250/252.1 |

* cited by examiner

*Primary Examiner*—Irakli Kiknadze

(57) ABSTRACT

A rod radiation source and its calibration phantom structure mainly have an anti-leak filter layer on one side of a lower lamination layer, and have the anti-leak filter layer evenly deposited with plural drops of liquid radiation sources with each drop of radiation source neighboring but not overlapping, and use an upper lamination layer to cover the anti-leak filter layer to protect each radiation source, and have the above assembly rolled into a rod as a rod radiation source. In another cylindrical container that has a stack of plural sheets, the rod radiation sources get evenly distributed along the axle center and pass each sheet to form a calibration phantom structure for a rod radiation source.

23 Claims, 4 Drawing Sheets

STRUCTURE FOR A ROD RADIATION SOURCE AND ITS CALIBRATION PHANTOM

BACKGROUND OF THE INVENTION

1. Field of the Invention

The invention relates to the structure for a rod radiation source and its calibration phantom. Especially, it is the calibration phantom formed in a cylindrical container by utilizing a rod radiation source with different sheet materials. It is used to obtain the calibration curve for density and counting efficiency and measure the gamma radiation activity for different nuclear wastes.

2. Description of the Prior Art

Presently, the total gamma radiation activity measurement equipment for low-activity bulk nuclear wastes is the Waste Curie Monitor assembled from large-area plastic scintillation detectors. Its advantages are high radiation sensitivity, high counting efficiency, no limit on waste volume and capability of indicating sample weight etc.

However, the traditional Waste Curie Monitor has the following drawbacks for its calibration method:

1. Underestimate or overestimate for activity measurement: it usually considers weight only, and therefore it overlooks the self-absorption effect due to the different material density for different waste sample.

2. Unsuitability for counting efficiency calibration: it usually uses a single material in a monitor shield to establish density efficiency, but overlooks the compositions for non-single materials.

3. Incompliance for sample measurement location: it usually puts the sample in the lower place in the shield and therefore the location deviates from geometric center for efficiency calibration.

4. Incompliance for sample volume: it usually does not restrict sample volume; the inconsistent distance from each scintillation detector during efficiency calibration causes errors in activity analysis; thus, it can not meet the accuracy requirement for radioactive waste activity analysis by radiation protection safety management.

5. There is no correction for the total activity measurement error in radiation energy and gamma activity calculation for the waste samples with various radioactive nuclides.

In recent years, researchers further develop new methods to replace the traditional calibration method that uses a point radiation source at the geometric center of the activity monitor. They are used for total gamma activity measurement for radioactive wastes in the classification process to identify and distinguish the radioactive wastes from non-radioactive wastes. The efficiency calibration method for present plastic scintillation detector is described in the following:

1. US Themo-Eberline company uses transmission factor to correct for the self-absorption effect due to different standard mass. The formula is TF=net count for shielded radiation source/net count for non-shielded radiation source. In general, TF≦1.0 as the calibration efficiency at geometric center for non-shielded radiation source in compensative air. The transmission factor for the water phantom that has completed efficiency calibration is set to 1. Sample weight is entered for mass parameter (one unit per 10 kg). Therefore, the sample with different weight will obtain corrected total gamma activity against the weight of standard that has transmission factor 1.

2. German RADOS company uses multi-density calibration efficiency from a single material of iron sheet.

3. Japan Nuclear Energy Safety Organization uses multi-nuclide calibration efficiency from metal pipes and metal sheets.

4. US NE Technology company uses multi-weight (0~60 Kg) calibration efficiency from multi-nuclide point radiation source and single material Brazil wood (density=1).

Nevertheless, present correction methods only consider approximate weight and geometry, and therefore do not provide full correction for self-absorption effect due to material mass and interactions between various material masses and energy. They all fail to provide accurate total gamma activity.

In view of the above drawbacks with the traditional radiation source calibration methods, the inventor has made significant improvement in the invention.

SUMMARY OF THE INVENTION

The main objective for the invention is to provide a structure for a rod radiation source. It is a cylindrical rod that is made of flexible sheet radiation source. It has the structure of a rod radiation source that can distinguish from the traditional sheet radiation source.

Another objective for the invention is to provide a calibration phantom structure for the rod radiation source. It puts different number of rod radiation sources along the axle center into a cylindrical container at different locations and therefore they pass the different sheet materials accommodated by the cylindrical container to be able to form a calibration phantom with different density. As a consequence, this will facilitate assembly and replacement.

To achieve the above objectives, the invention adopts the following technical approaches. A rod radiation source structure at least comprises a lower lamination layer, an anti-leak filter layer located above the lower lamination layer, plural radiation sources deposited evenly on the anti-leak filter layer with each source neighboring but not overlapping, and an upper lamination layer located above the anti-leak filter layer to protect all radiation sources. The above components can be rolled into a rod.

A calibration phantom structure for a rod radiation source at least comprises a cylindrical container, plural sheets stacked in the cylindrical container, and at least a rod radiation source in strip shape with evenly distributed γ radiation sources inside and locating along the axle center in the cylindrical container as well as passing each sheet.

To further make the above objectives, functions and features of the invention understandable, the following figures are provided for explanation.

DETAILED DESCRIPTION OF THE PREFERRED EMBODIMENT

Figure 1:
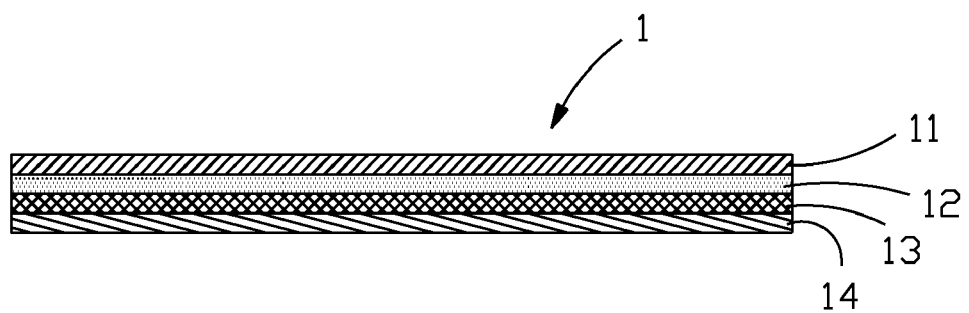
FIG. 1 is a cross-sectional diagram for the rod radiation source in an opening state for the invention.
Figure 2:
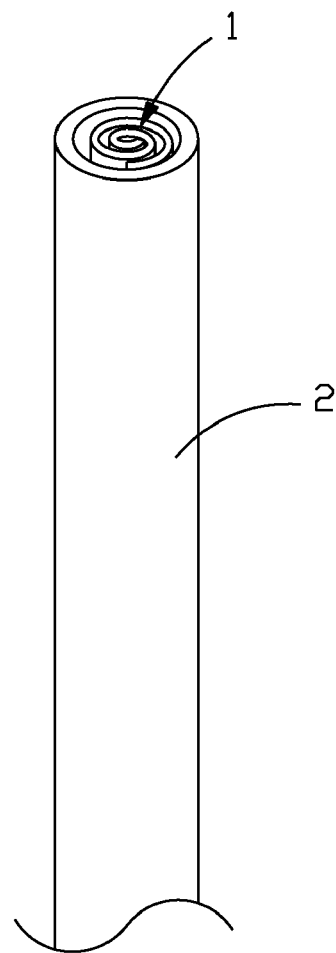
FIG. 2 is a structural diagram for the rod radiation source for the invention.
Figure 3:
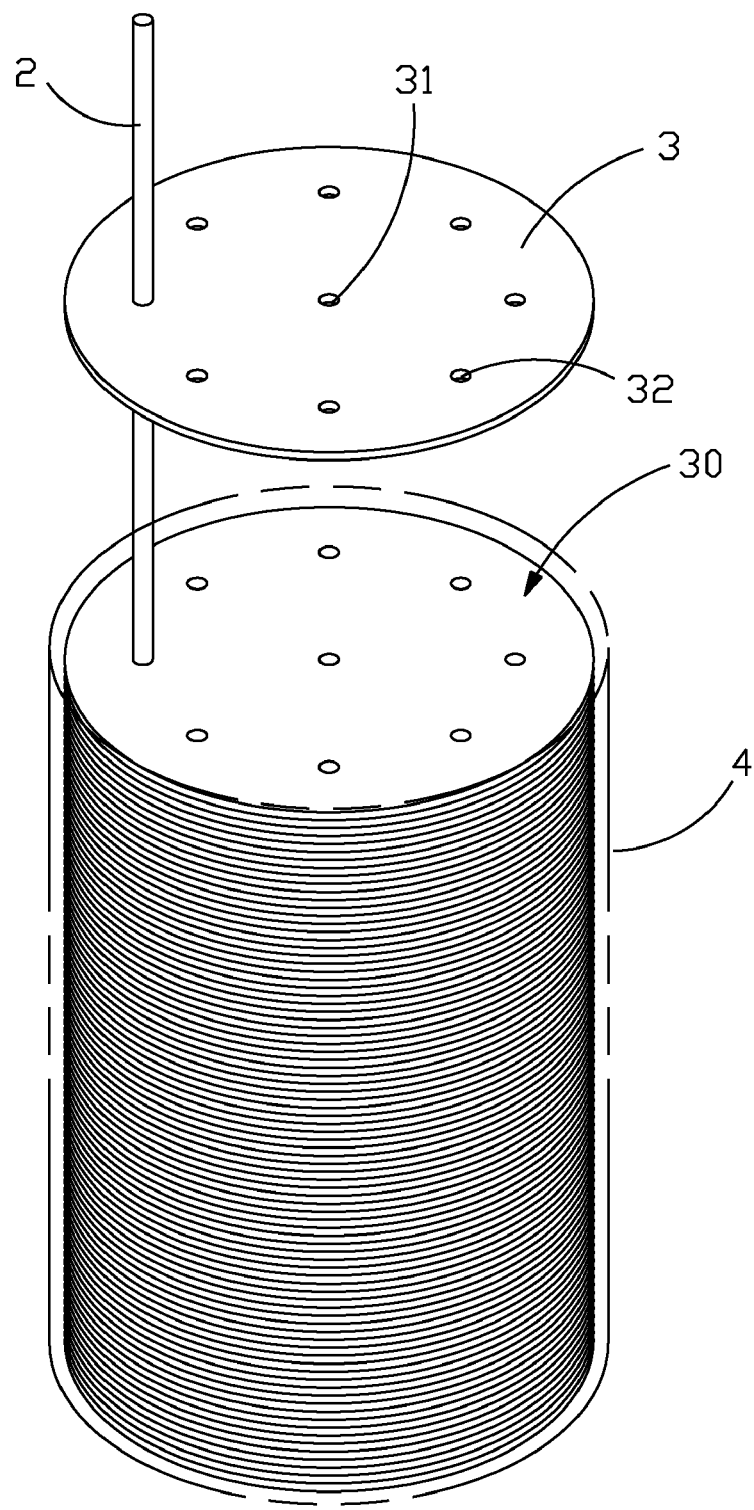
FIG. 3 is a structural diagram for the cylindrical source calibration phantom for the rod radiation source for the invention.

Please refer to FIG. 1 and FIG. 3. It is obvious that the rod radiation source 1 for the invention when being opened mainly comprises an upper lamination layer 11, a radiation source 12, an anti-leak filter layer 13 and a lower lamination layer 14. The radiation source 12 is liquid evenly deposited in 0.1 cc on the anti-leak filter layer 13. Each liquid drop of radiation source expands to a circle of diameter less than 5 cm. These circles are neighboring, but not overlapping. They are located on the upper and lower sides of the anti-leak filter layer 13 with the upper and lower lamination layers 11, 14. The above rod radiation source 1 is rolled into a circular pipe 2 of length 66 cm, outer diameter 2 cm and inner diameter 1.5 cm, which completes a rod radiation source.

In the above structure for the invention, the radiation source 12 is a γ radiation source ($^{57}$Co, $^{137}$Cs, $^{54}$Mn, $^{60}$Co), which total activities are 43 kBq, 31 kBq, 32 kBq and 23 kBq respectively.

Please refer to FIG. 3. It can be known that the cylindrical calibration phantom for the above rod radiation source for the invention mainly comprises a cylindrical container 4, a sheet assembly 30 and a rod radiation source (i.e. a circular pipe 2 to accommodate the rod radiation source 1). The sheet assembly 30 is made of plural circular sheets 3 of diameter 40 cm and thickness 1 cm stacking together. In the center (axle center) of each sheet 3 there is a central hole 31, 19 cm from which there are 8 side holes 32 around and separate in equal distance. The sheet assembly 30 is placed in a 55-gallon cylindrical container 4 of diameter 57 cm and height 86 cm. The above sheets 3 can be made from five different materials that are cut into pieces. The material weigh range is 30 kg~490 kg. Knowing the material weight and the container volume (200,000 cm$^3$), it is able to calculate the average density for each material (as shown in Table 1): paper sheet (density 0.15 g/cm$^3$), wood sheet (density 0.55 g/cm$^3$), plastics (density 1.13 g/cm$^3$), cement(density 1.80 g/cm$^3$) and glass(density 2.5 g/cm$^3$). 9 rod radiation sources for each nuclide of $^{57}$Co, $^{137}$Cs, $^{54}$Mn and $^{60}$Co are placed in the central hole 31 and each side hole 32 for the sheet assembly 30 in a way that each rod radiation source is 9.5 cm from the upper and lower sides of the cylindrical container 4. The surrounding area for each of the 9 rod radiation sources is 238.4 cm$^2$.

TABLE 1

| Material | Volume (cm$^3$) | Weight (Kg) | Density (g/cm$^3$) |
| --- | --- | --- | --- |
| Paper sheet | 200,000 | 30 | 0.15 |
| Wood sheet | 200,000 | 101 | 0.49 |
| Plastics (PVC) | 200,000 | 233 | 1.13 |
| Cement | 200,000 | 422 | 1.97 |
| Glass | 200,000 | 491 | 2.37 |

Figure 4:
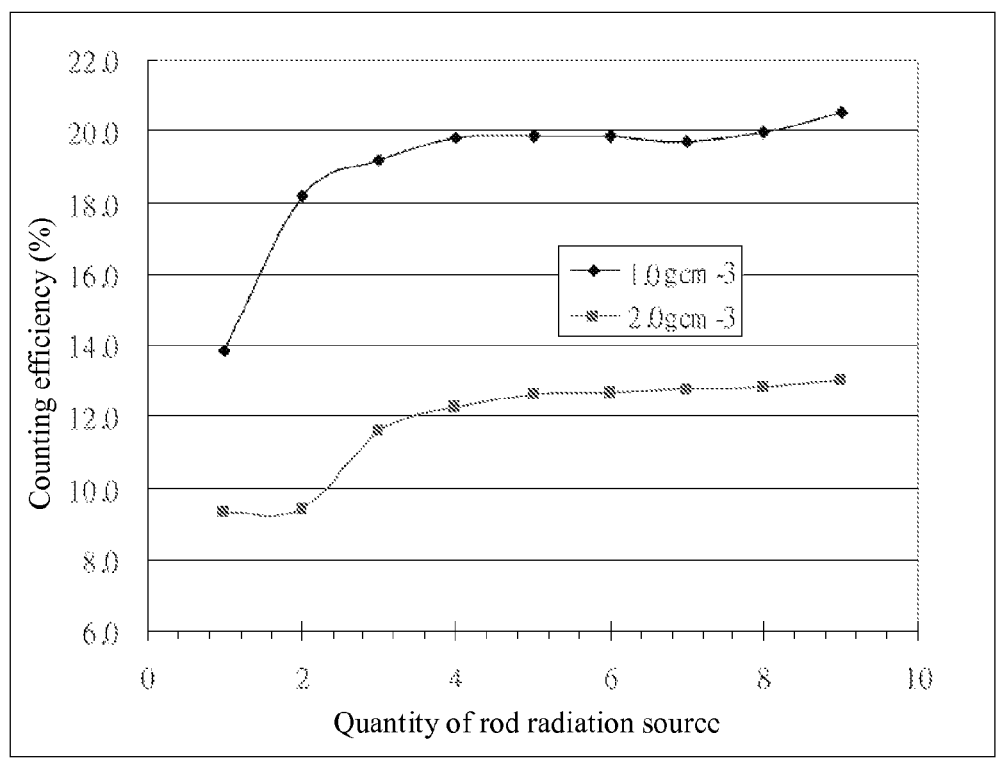
FIG. 4 is the counting efficiency for the calibration phantom with different number of rod radiation source for the invention.

Please refer to FIG. 4. It is known that when the calibration phantom for the invention is measuring the counting efficiency for various number of rod radiation sources the above cylindrical container 4 can be put in a hexagonal Waste Curie Monitor that is assembled from symmetric large-area plastic scintillation detectors, so the cylindrical container 4 surface has the equal distance from the upper (1 unit), lower (1 unit), left (2 units), right (2 units), front (2 units), back (2 units), 10 scintillation detectors in total. Then the completed 9 rod radiation sourced are placed in order in the center (axis center) of the cylindrical container 4 for the first unit and then in the peripheral for the second unit to the 9$^{th}$ unit in equal distance of separation. Take $^{60}$Co as an example. In a calibration phantom of density 1.1 g/cm$^3$ and 2.0 g/cm$^3$, the counting efficiency (as shown in FIG. 4) for different number of rod radiation sources can be obtained with counting efficiency range 13.9%~19.0% and 9.3%~11.8% respectively, and average efficiency 19.0% and 11.8% respectively. In a calibration phantom of density 1.1 g/cm$^3$ and 2.0 g/cm$^3$, the simulation curve for the 3$^{rd}$ to the 9$^{th}$ rod radiation source indicates there is no clear trend for the efficiency to increase with the rod number. When the number is increased to 9, the counting efficiency is increased relative to the average efficiency only by about 7.9 and 10.1%. Therefore, it is reasonable to use 9 rod radiation sources for the calibration phantom.

Figure 5:
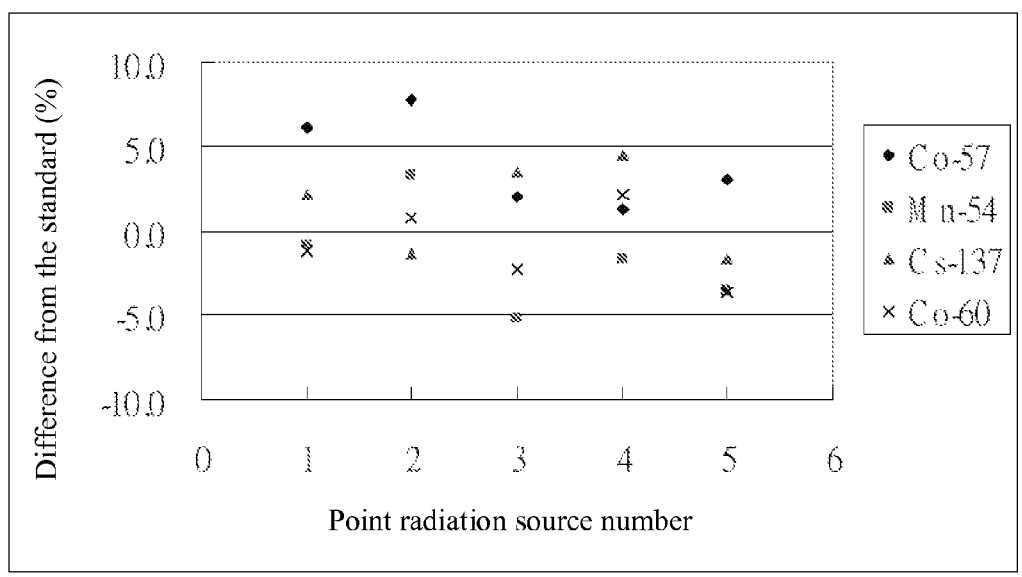
FIG. 5 is the activity accuracy diagram for the point radiation source for the rod radiation source for the invention.

Please refer to FIG. 5. In an iron shield of thickness 10 cm, a pure germanium detector that has 40% counting efficiency relative to sodium iodide (Thallium) detector is used to measure 5 point radiation sources for each nuclide of $^{57}$Co, $^{137}$Cs, $^{54}$Mn and $^{60}$Co respectively in a distance of 25 cm with quantitative error for activity count approximately 5%. Traceable to the original standard by National Radiation Standard Laboratory, the activities for each liquid point radiation source that is produced by weight method are 1107 Bq, 803 Bq, 657 Bq and 657 Bq respectively. The largest difference in detection results between the radiation sources of four nuclides in the germanium detector and the above produced point radiation sources is below 10%. The activity accuracy for the point radiation source for the calibration phantom in the detector rod radiation source is shown in FIG. 5.

Figure 6:
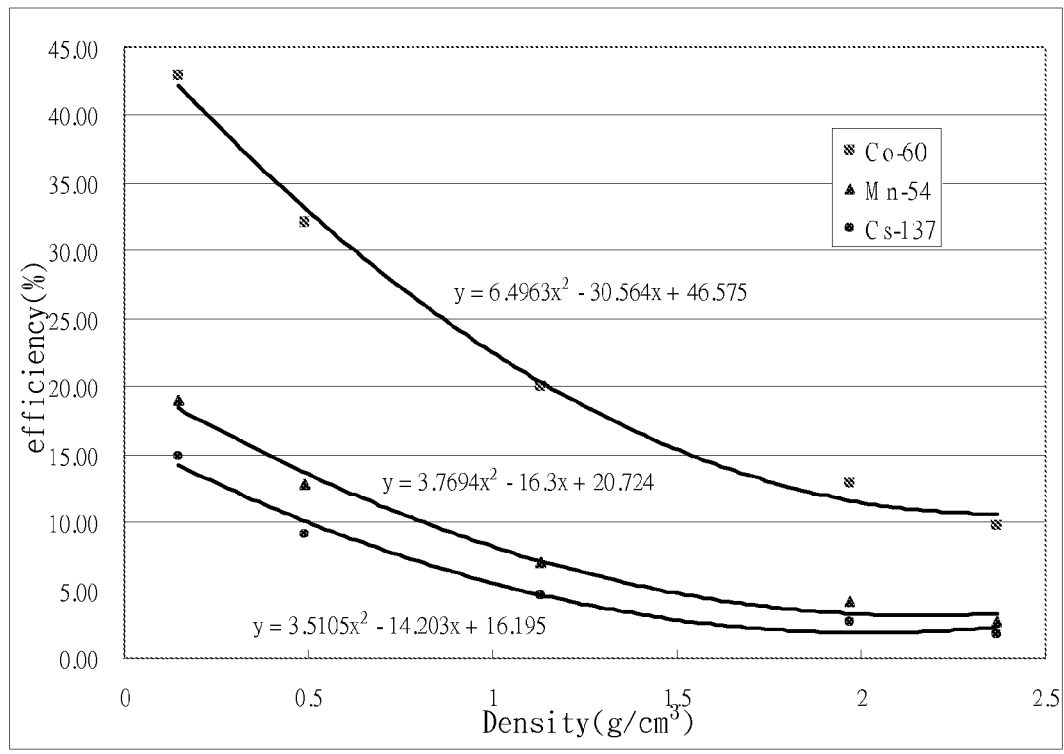
FIG. 6 is the relationship diagram for density and nuclide counting efficiency for the calibration phantom for the invention.

Please refer to FIG. 6. Five calibration phantoms of different densities are placed in the monitor shield and nuclides of $^{57}$Co, $^{137}$Cs, $^{54}$Mn and $^{60}$Co are used to count the efficiency. With the average material density 0.15 g/cm$^3$~2.4 g/cm$^3$, the counting efficiencies for nuclides of $^{54}$Mn, $^{60}$Co and $^{137}$Cs are 20.7%~2.1%, 41.6%~6.9% and 14.2%~1.1% respectively. The density and nuclide counting efficiency for the calibration phantom are shown in FIG. 6.

Figure 7:
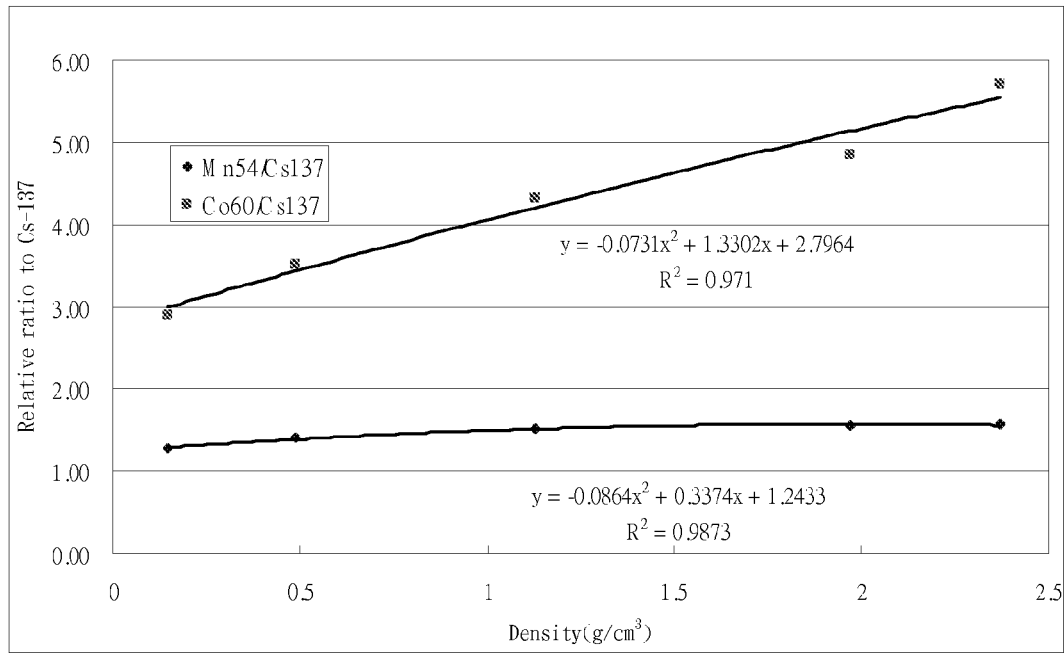
FIG. 7 is the diagram for the counting efficiency relative to $^{137}$Cs for nuclides of different densities.

Please refer to FIG. 7 for the counting efficiency relative to 137Cs for nuclides of different densities. It is known that the nuclide counting efficiency for $^{54}$Mn and $^{60}$Co relative to $^{137}$Cs indicates that the higher energy relative to $^{137}$ the higher the nuclide counting efficiency. Since $^{54}$Mn energy is only slightly higher than $^{137}$Cs energy, the counting efficiency ratio relative for different density relative to $^{137}$Cs does not vary much and is approximately within 2. Besides, the nuclide counting efficiency for individual nuclides like $^{54}$Mn and $^{60}$Co relative to $^{137}$Cs increases with increasing density.

In summary, the rod radiation source and its calibration phantom structure can facilitate easy assembly and replacement. It is an invention of innovation and progressiveness. Thus an application for patent is filed. However, the above description is only for preferred embodiment. Those variations, modifications, alterations or equivalent substitutions based on the extension of the technical approaches and scope for the invention shall fall within the scope of the claims by the invention.

What is claimed is:

1. A rod radiation source structure at least comprises:
a lower lamination layer;
an anti-leak filter layer located above the lower lamination layer;
plural radiation sources evenly deposited on the anti-leak filter layer and neighboring to each other but not overlapping;

an upper lamination layer located above the anti-leak filter layer to protect each radiation source, and therefore being capable of rolling into a rod that has the upper lamination layer inside and the lower lamination layer outside.

2. As the rod radiation source structure in claim 1, the radiation source is γ radiation source.

3. As the rod radiation source structure in claim 2, the γ radiation source can be combination of plural γ radiation sources of $^{57}$Co, $^{137}$Cs, $^{54}$Mn and $^{60}$Co or either one of them.

4. As the rod radiation source structure in claim 3, the expansion diameter for each radiation source is less than 5 cm.

5. As the rod radiation source structure in claim 3, the rod is accommodated by a circular pipe.

6. As the rod radiation source structure in claim 5, the circular pipe has inner diameter 1.5 cm and outer diameter 2 cm.

7. As the rod radiation source structure in claim 6, the circular pipe has length 66 cm.

8. As the rod radiation source structure in claim 1, the expansion diameter for each radiation source is less than 5 cm.

9. As the rod radiation source structure in claim 8, the rod is accommodated by a circular pipe.

10. As the rod radiation source structure in claim 9, the circular pipe has inner diameter 1.5 cm and outer diameter 2 cm.

11. As the rod radiation source structure in claim 10, the circular pipe has length 66 cm.

12. As the rod radiation source structure in claim 1, the rod is accommodated by a circular pipe.

13. As the rod radiation source structure in claim 12, the circular pipe has inner diameter 1.5 cm and outer diameter 2 cm.

14. As the rod radiation source structure in claim 13, the circular pipe has length 66 cm.

15. The calibration phantom for a rod radiation source at least comprises:
   a cylindrical container;
   plural sheets stacked in the cylindrical container; and
   at least a rod radiation source in a strip with evenly distributed γ radiation sources along the axle center in the cylindrical container and passing a sheet.

16. As the rod radiation source structure in claim 15, at least one rod is located in the axle center of the cylindrical container.

17. As the rod radiation source structure in claim 16, plural rods are located in equal separation distance on a certain peripheral of the axle center.

18. As the rod radiation source structure in claim 15, the sheet can be metal or non-metal.

19. As the rod radiation source structure in claim 18, the non-metal material can be paper, wood or plastics.

20. As the rod radiation source structure in claim 19, it can be selected with several γ radiation sources with several total activities.

21. As the rod radiation source structure in claim 18, the γ radiation source can be combination of plural γ radiation sources of $^{57}$Co, $^{137}$Cs, $^{54}$Mn and $^{60}$Co or either one of them.

22. As the rod radiation source structure in claim 15, the γ radiation source can be combination of plural γ radiation sources of $^{57}$Co, $^{137}$Cs, $^{54}$Mn and $^{60}$Co or either one of them.

23. As the rod radiation source structure in claim 22, the γ radiation source can be combination of plural γ radiation sources of $^{57}$Co, $^{137}$Cs, $^{54}$Mn and $^{60}$Co or either one of them.

* * * * *